United States Patent [19]

Schlichter et al.

[11] Patent Number: 5,398,381
[45] Date of Patent: Mar. 21, 1995

[54] MEASURING CLOTHING CLEARANCES DIRECTLY AT THE FACING POINTS

[75] Inventors: Stefan Schlichter, Viersen; Ferdinand Leifeld, Kempen, both of Germany

[73] Assignee: Trützschler GmbH & Co. KG, Mönchengladbach, Germany

[21] Appl. No.: 139,795

[22] Filed: Oct. 22, 1993

[30] Foreign Application Priority Data

Oct. 22, 1992 [DE] Germany ............ 42 35 610.5

[51] Int. Cl.⁶ .................... D01G 15/08; D01G 15/24; G01B 7/14
[52] U.S. Cl. ....................... 19/102; 19/104; 324/243
[58] Field of Search ............... 19/98, 103, 104, 105, 19/110, 111, 113, 114; 324/200, 207.11, 207.12, 207.13, 207.15, 207.22, 207.25, 207.26, 229–243; 364/470, 474.12, 474.13, 474.16, 474.18, 474.19

[56] References Cited

U.S. PATENT DOCUMENTS

| 4,451,892 | 5/1984 | McMurtry | 364/474.17 X |
| 4,804,905 | 2/1989 | Ding et al. | 324/76.11 |
| 4,820,980 | 4/1989 | Dodson-Edgars | 324/207.25 X |
| 4,947,522 | 8/1990 | Staehli | 19/104 |
| 4,982,478 | 1/1981 | Stahli et al. | 19/104 X |
| 4,996,745 | 3/1991 | Sutcliffe | 19/103 X |
| 5,040,272 | 8/1991 | Fritzch | 19/104 |

FOREIGN PATENT DOCUMENTS

| 0065848 | 12/1982 | European Pat. Off. | 19/102 |
| 2522558 | 12/1976 | Germany . | |
| 2343393 | 6/1988 | Germany . | |
| 2948825 | 8/1989 | Germany . | |
| 3913996 | 8/1990 | Germany . | |
| 3924376 | 1/1991 | Germany . | |
| 4107426 | 9/1992 | Germany . | |
| 1226029 | 4/1986 | U.S.S.R. . | |
| 70/00983 | 11/1979 | WIPO . | |

Primary Examiner—Clifford D. Crowder
Assistant Examiner—Ismael Izaguirre
Attorney, Agent, or Firm—Spencer, Frank & Schneider

[57] ABSTRACT

A fiber processing machine includes a fiber processing roll carrying a first clothing on the surface thereof; and a countermember carrying a second clothing thereon. The first and second clothings cooperate with one another during operation of the fiber processing machine. A sensor determines a clearance between facing points of the first and second clothings. The sensor is mounted on the countermember and faces the first clothing when effecting measurement of the clearance.

15 Claims, 6 Drawing Sheets

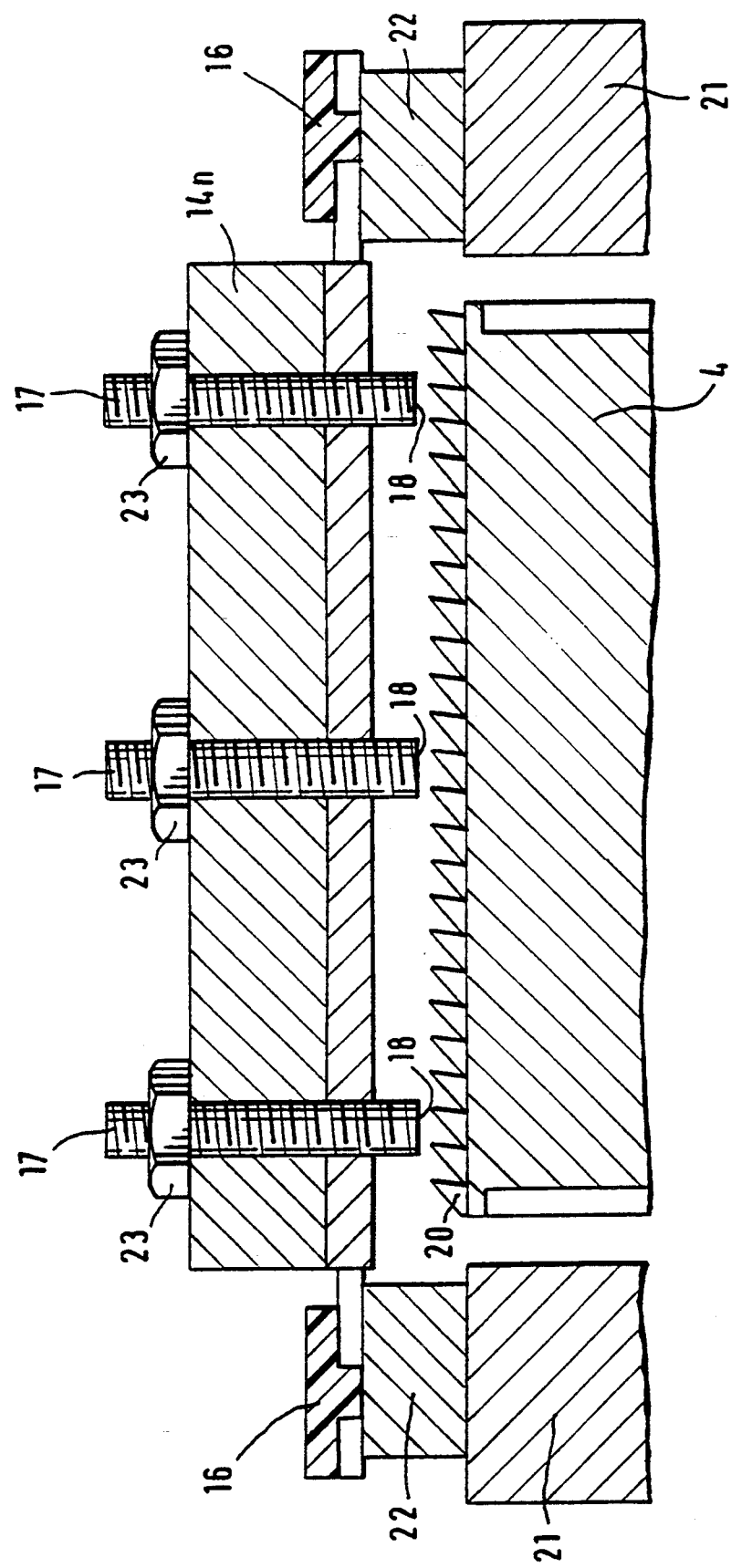

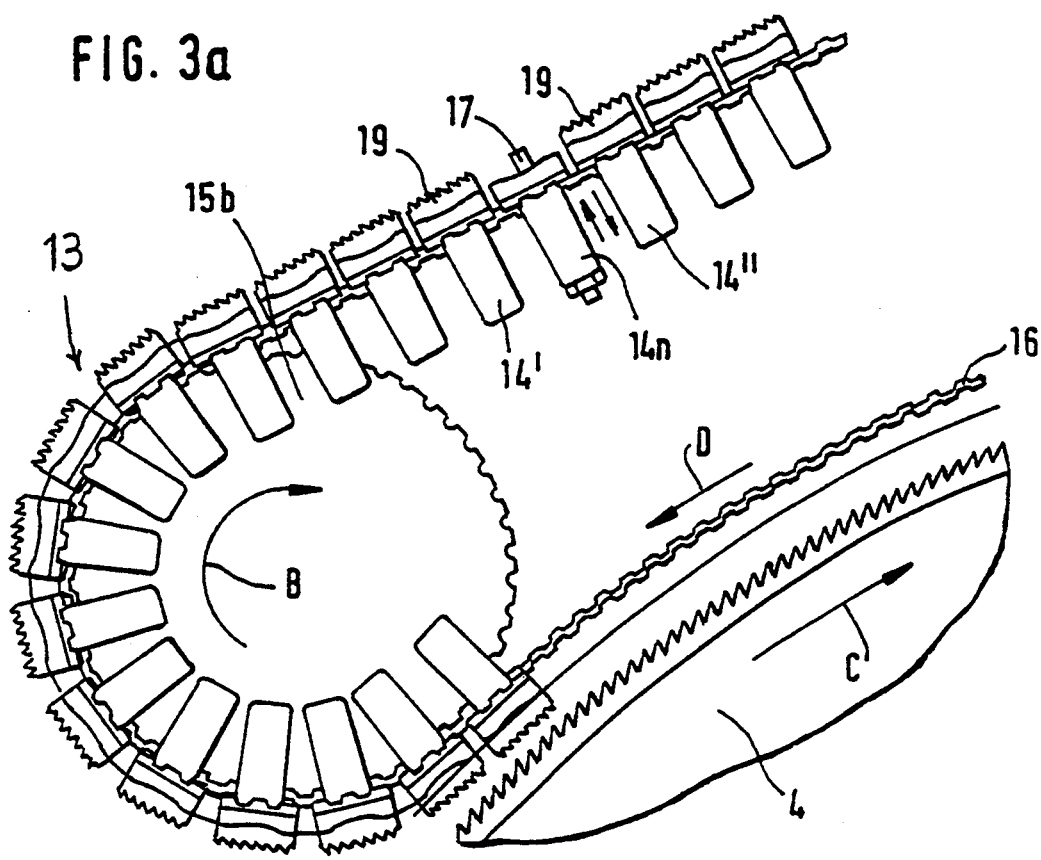
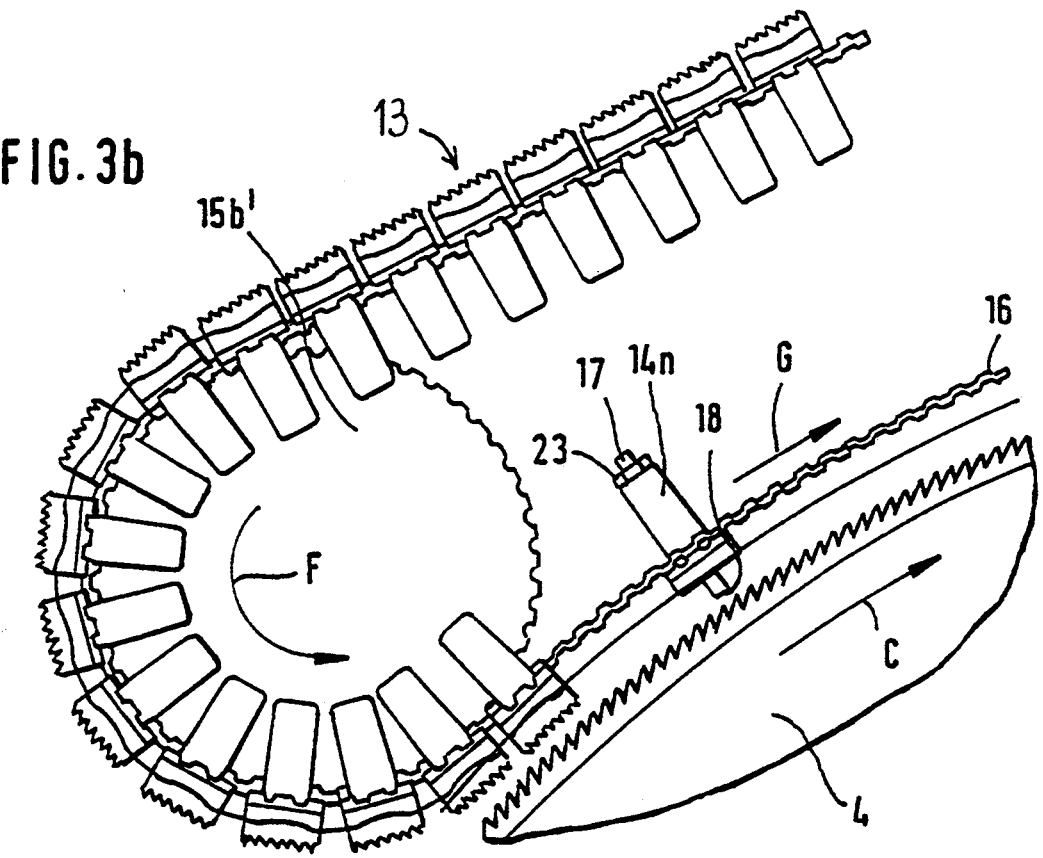

MEASURING CLOTHING CLEARANCES DIRECTLY AT THE FACING POINTS

CROSS REFERENCE TO RELATED APPLICATION

This application claims the priority of German Application No. P 42 35 610.5 filed Oct, 22, 1992, which is incorporated herein by reference.

BACKGROUND OF THE INVENTION

This invention relates to textile fiber processing machines, such as cards, cleaners or the like and is more particularly concerned with an apparatus for measuring the clearance between clothings of two cooperating components such as a clothed roll and a clothed countermember, such as a travelling flat bar. The apparatus includes at least one sensor which determines the clearance between two clothings, that is, it detects the distance between the points of one clothing on the one hand and the points of the other clothing, on the other hand.

In the assembling operation of carding machines, a predetermined distance between the clothed main carding cylinder and the flats, for example, the travelling flats is set manually with the aid of templates. Such an adjusting operation also sets, at the same time, the clearance between the points of the carding cylinder clothing and the points of the flat clothing. During operation, centrifugal forces and thermal expansions alter the distance between the carding cylinder and the flats and thus, likewise, the clearance between the clothing points of the carding cylinder and the flats varies. Such a change is, as a rule, taken into consideration during the manual setting.

In a known apparatus, between the clothed carding cylinder and the clothed flats cooperating therewith at least on one side of the carding cylinder, externally of the clothing respective sensors are positioned for monitoring, during operation, the set distance between the carding cylinder and the flats. The distance is always measured from the carding cylinder. On the flats, opposite the carding cylinder, counter members are associated with the sensors. Upon changes caused by centrifugal forces and thermal expansions during operation the distance between the sensor and the counter member diminishes and thus, during operation, the known apparatus may directly measure the altered distance between the carding cylinder and the flats. In case the clothing has been replaced by a new clothing that is, there is no wear-caused change of the point height of the clothings—a change of the originally set distance between the clothing points of the carding cylinder and the clothing points of the flats may be indirectly determined. Such a conventional arrangement is disadvantageous in that during operation the actual distance between the clothing points cannot be measured after an extended run of the machine. The point height of the clothing is reduced because of wear so that the distance between the carding cylinder and the flats on the one hand and the distance between the facing clothing points on the other hand become increasingly independent from one another as the service period increases. It is a further disadvantage that measuring a change of the clothing point height of the carding cylinder clothing is not possible after an extended operational period.

SUMMARY OF THE INVENTION

It is an object of the invention to provide an improved fiber processing machine of the above-outlined type from which the discussed disadvantages are eliminated and which, in particular, makes possible to measure the clearance between the clothing points of a roll, such as a carding cylinder and the clothing points of a carding element, such as a travelling flat and further permits an alteration of the clothing point heights of the clothed roll during operation, after an extended run.

This object and others to become apparent as the specification progresses, are accomplished by the invention, according to which, briefly stated, the fiber processing machine includes a fiber processing roll carrying a first clothing on the surface thereof; and a countermember carrying a second clothing thereon. The first and second clothings cooperate with one another during operation of the fiber processing machine. A sensor determines a clearance between facing points of the first and second clothings. The sensor is mounted on the countermember and faces the first clothing when effecting measurement of the clearance.

By associating the sensor with the flat (countermember) and orienting it to face the roll clothing, the distance between the sensor and the roll clothing may be directly measured. In this manner, a change in the point height of the clothings and thus a change of the clothing distance caused by wear after an extended run may be reliably measured during operation. By positioning the sensor to face the roll clothing, it is feasible to effect a direct measurement of the clearance of the roll clothing and the change of its point height.

The invention has the following additional advantageous features:

The flat is a component of travelling flats of a carding machine.

The flat is a stationarily supported component.

The sensor is radially arranged and/or radially adjustable relative to the clothed cylinder.

A plurality of sensors are arranged along the width of the flat.

The surface of the sensor is at the same height level as the points of the flat clothing.

The surface of the sensor is recessed relative to the height of the flat clothing points.

The sensor is of the inductive type.

The flat which carries the sensor may be removed or installed during run.

The sensor is coupled with an electronic evaluating device, for example, a microcomputer.

The sensor is connected by conductors to the evaluating device.

The sensor is coupled in a wireless manner to the evaluating device.

The sensor is connected with a memory for storing measured values therein.

The value of the measured clothing distance is used as an input magnitude in a regulating device for regulating the distance between the flat and the cylinder.

The position of the flexible bend for the flats is set to effect a distance setting of the flats.

The sensor is mounted on a component which faces the roll clothing and which may be a cover, a stationary carding element or the like.

BRIEF DESCRIPTION OF THE DRAWINGS

FIG. 2 is a sectional front elevational view of a travelling flats assembly in a carding machine, incorporating a preferred embodiment of the invention.

FIG. 3a is a schematic side elevational view of an end zone of a travelling flats assembly of a carding machine incorporating the invention and illustrating a first operational position.

FIG. 3b is a view similar to FIG. 3a showing the construction in a second operational position.

DESCRIPTION OF THE PREFERRED EMBODIMENTS

Figure 1:
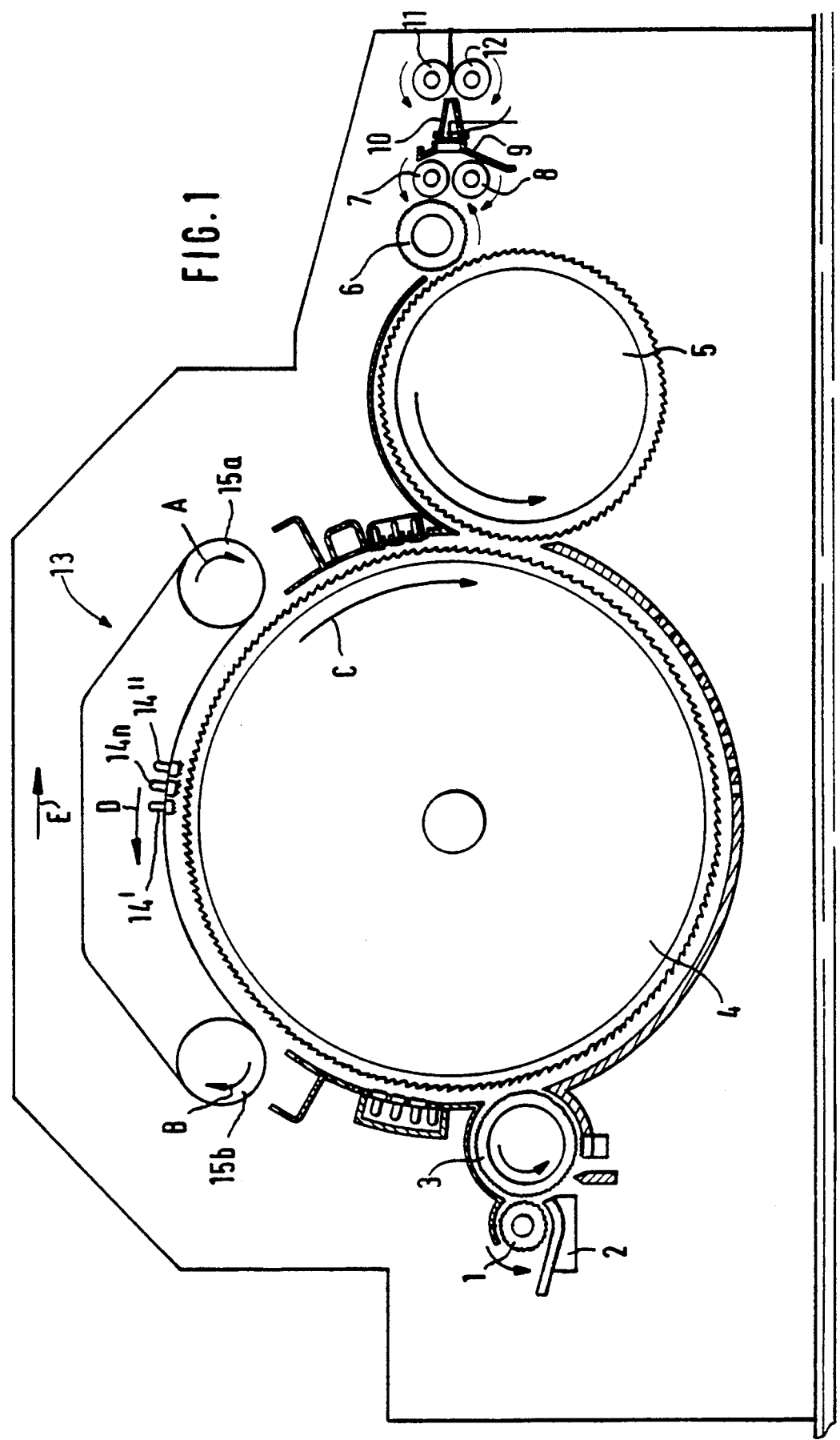
FIG. 1 is a schematic side elevational view of a carding machine incorporating the invention.

Turning to FIG. 1, there is shown therein a carding machine, such as an EXACTACARD 740 model, manufactured by Trtzschler GmbH & Co. KG, Mönchengladbach, Germany. The carding machine has a feed roller 1, a feed table 2 cooperating with the feed roller 1, a licker-in 3, a carding cylinder 4, a doffer 5, stripping rolls 6, crushing rolls 7 and 8, a web guiding element 9, a sliver trumpet 10, calender rolls 11 and 12 as well as travelling flats 13. The direction of rotation of the front and rear end rollers 15a, 15b of the travelling flats is the same as the direction of rotation of the carding cylinder 4. The direction of rotation of the end rollers 15a and 15b is designated at A and B, respectively, whereas the direction of rotation of the carding cylinder 4 is indicated by the arrow C Also referring to FIG. 2, the flat bars 14', 14" and 14n of the travelling flats assembly 13 are, in their working run, carried in the direction of the arrow D by bilaterally toothed belts 16 gliding on a slideway 22 formed on a flexible bend 21. The upper run of the travelling flats is the idle run which advances as indicated by the arrow E.

As shown in FIG. 2, three sensors 17 are mounted on the flat bar 14n along the length thereof (the length being measured in a direction perpendicular to the travelling direction of the flats). Each sensor 17 has a sensor face 18 oriented towards the clothing 20 of the carding cylinder 4.

FIGS. 3a and 3b show the flat bar 14n which carries the sensors 17 (only one is visible) and which is situated between the two flat bars 14' and 14". The flat bars 14' and 14" similarly to all the other flat bars with the exception of the flat bar 14n, are provided with a flat clothing 19.

As shown in FIG. 2, a precision screw and nut assembly 23 at the rearward terminus of each sensor 17 ensures an exact axial adjustment of the position of the sensor surface 18 with respect to the flat clothing 19 (not seen in FIG. 2). It is noted that departing from the illustration in FIGS. 1 and 3a, the travelling flats assembly 13 according to FIG. 3b runs codirectionally with the adjoining portion of the carding cylinder 4, that is, the illustrated rear end roller 15b' rotates counterclockwise in the direction of the arrow F. In its working run (that is, during the period it cooperates with the clothing of the cylinder 4) the belt 16 moves in the direction G which is opposite to the direction D.

Turning to FIGS. 4a–4d, there are illustrated therein the two significant dimensions and (provided with various suffixes 1 through 4) at different times of service. a is the distance between the surface 4a of the carding cylinder 4 and the surface 14a of the flat bar 14 as these two components cooperate in handling the fiber material therebetween, whereas is the distance between the flat clothing 19 and the cylinder clothing 20, that is, the clearance between the clothing points between the two clothings.

Figure 4A:
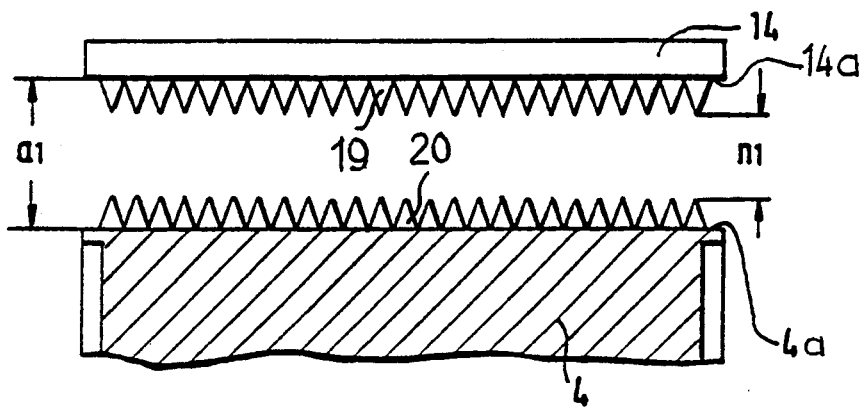
FIG. 4a is a schematic front elevational view of a clothed cylinder and a clothed flat showing the clearance between clothing points upon the assembly of the card.

Turning specifically to FIG. 4a, in assembling the carding machine, the distance a1 is determined based on the requirements concerning tooth height, material throughput as well as rpm, whereupon the clothing point distance n1 is obtained.

Figure 4B:
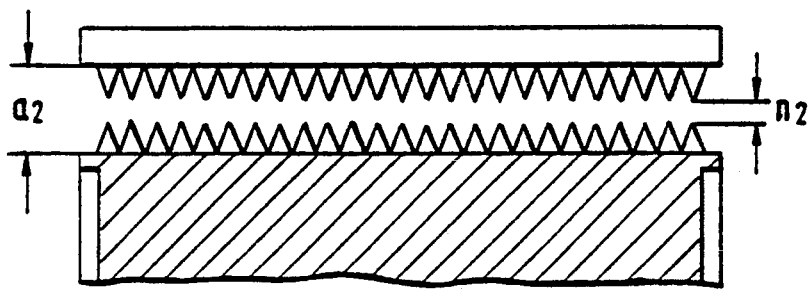
FIG. 4b is a schematic front elevational view of a clothed cylinder and a clothed flat showing the distance between the clothing points after a short run.

The distances shown in FIG. 4b represent values measured after a short run of the machine. It is noted that centrifugal forces, particularly those appearing at the carding cylinder, have caused a distance change. Similarly, an increase to the operating temperature causes an expansion, as a result of which both distances a2 and n2 have become smaller than distances a1 and n1. Since n2, however, is the desired distance, such a change has to be taken into account in advance.

Figure 4C:
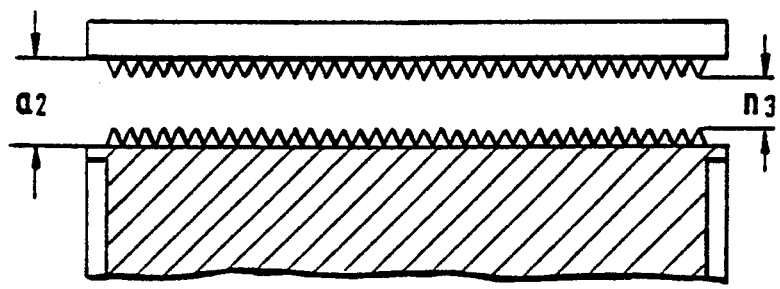
FIG. 4c is a schematic front elevational view of a clothed cylinder and a clothed flat showing the distance between the clothing points after an extended run.
Figure 4D:
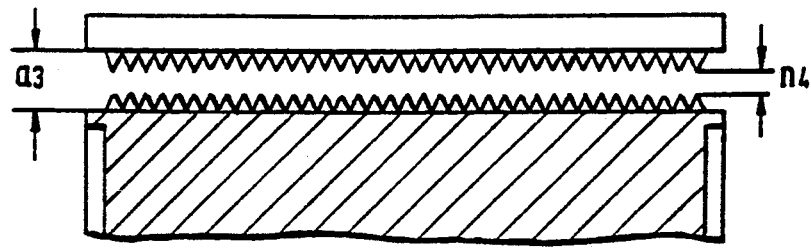
FIG. 4d is a schematic front elevational view of a clothed cylinder and a clothed flat showing the clearance after an adjustment of the clearance.

After an extended period of operation wear appears on the clothings as shown in FIG. 4c. The distance a2 which corresponded to the original desired distance a2 has not changed since the cylinder and the flat bars themselves have not been exposed to wear. The clearance n3, however, has changed. The distance n3 is thus greater than the desired distance n2 and, as shown in FIG. 4d, has been corrected by adjustment to assume the value n4 which essentially corresponds to the value n2. At the same time, the distance a2 has been changed to a3, the latter thus being less than the original working distance a2.

In its simplest embodiment the sensor 17 is inserted into one of the flat bars 14 and may be replaced during the run of the machine with a normal flat bar 14'. Since the travel speed of the flat bar is only about 8 cm per minute, such a replacement may be readily carried out.

Figure 5A:
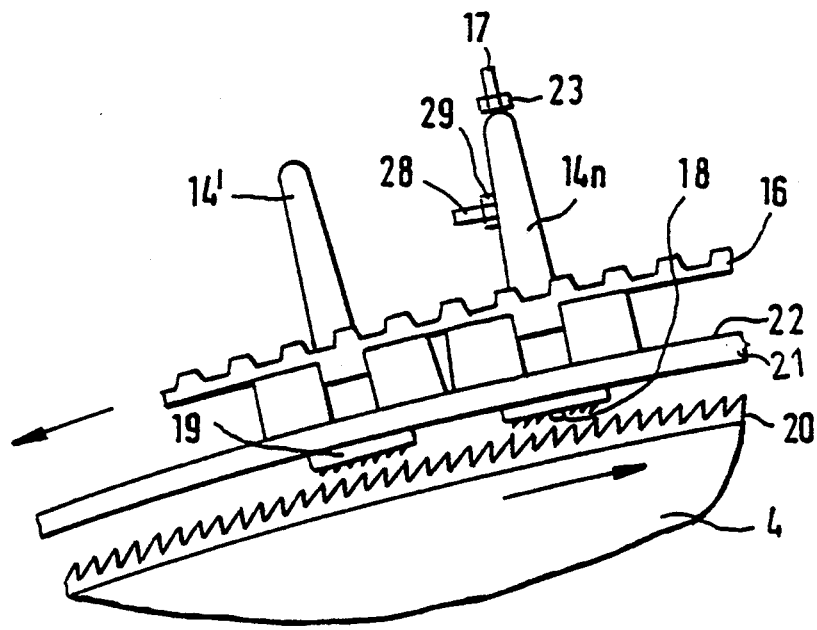
FIGS. 5a and 5b are schematic fragmentary side elevational views showing a carding cylinder and travelling flats and illustrating two variants of components for transmitting signals.
Figure 6:
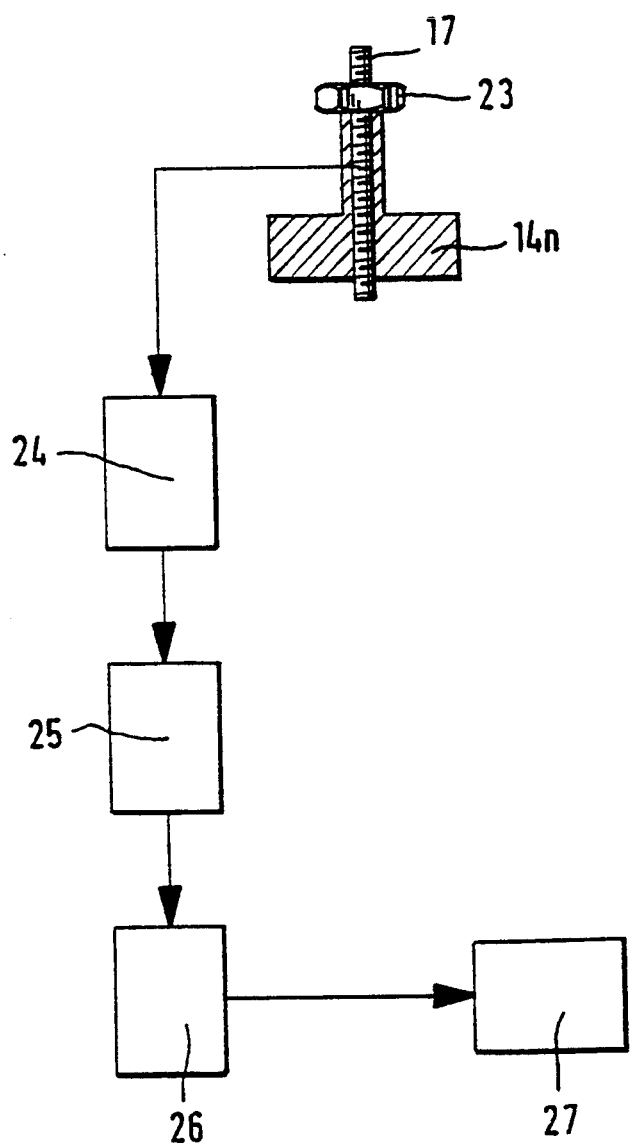
FIG. 6 is a sectional elevational view of a sensor according to the invention, with block diagram.

As shown in FIG. 5a, the flat bar 14n is provided with a socket 29 which may receive a jack of a cable 28. The cable 28 is connected with a measuring device 24 as shown in FIG. 6. Since measuring is carried out only when the sensor surface 18 is oriented towards (that is, faces) the cylinder clothing 20, the cable 28 is plugged into the socket 29 only after the sensor 17 has reached its measuring position.

Figure 5B:
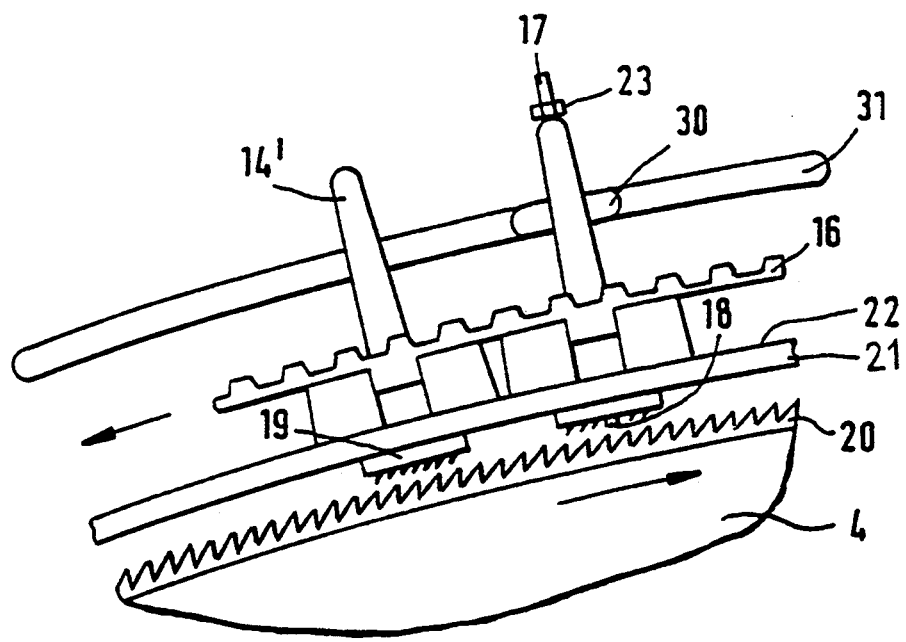

In the embodiment according to FIG. 5a, the electric contact has to be interrupted and reestablished several times in case a plurality of measurements has to be taken in the zone of the flexible bend 21. Departing from the embodiment shown in FIG. 5a, according to the embodiment illustrated in FIG. 5b, in the zone of the flexible bend 21 a current carrying rail 31 is affixed to the machine frame and the sensor 17 is in electric contact therewith by means of a contact slide 30. In this manner no repeated contacting and contact-breaking is necessary because upon each revolution the sensor 17 is automatically connected with the measuring device 24 by means of the contact rail 31.

Reverting to FIG. 6, the measuring apparatus 24 is connected with a measuring value transmitter 25 which displays or indicates the determined values and applies them to the machine (card) control 26 which includes a memory. The card control 26 then may send signals for adjusting the position of the flexible bend 21 in order to reset the distance or to adjust such distance based on new operational conditions. Simultaneously, the information is advanced to a card information system which includes a computer-and-display unit 27 where the data of an entire carding group may be monitored.

While in the above-described preferred embodiment the sensor is attached to a flat bar of the travelling flats assembly, it is feasible to mount the sensor on a machine component (such as a roll cover) which adjoins the clothing of the roll. It is also feasible to mount the sensor on a machine component which adjoins the travelling flats assembly. Such a machine component may be a rotatable beam situated in the zone of one of the end rollers 15a or 15b of the flats. By rotating the beam, the sensor may be selectively oriented either towards the flats clothing or towards the roll clothing.

It will be understood that the above description of the present invention is susceptible to various modifications, changes and adaptations, and the same are intended to be comprehended within the meaning and range of equivalents of the appended claims.

What is claimed is:

1. In a fiber processing machine including a fiber processing roll carrying a first clothing on the surface thereof; a countermember carrying a second clothing thereon; said first and second clothings cooperating with one another during operation of said fiber processing machine; and a sensor determining a clearance between facing points of said first and second clothings; the improvement wherein said sensor is mounted on said countermember.; said sensor being an inductive sensor having a face set at a position representing a height position of said points of said second clothing; further comprising means positioning said sensor for placing said face thereof directly opposite said points of said first clothing when effecting measurement of said clearance whereby a direct measurement of said clearance defined between said face and said points of said first clothing is effected.

2. The fiber processing machine as defined in claim 1, wherein said fiber processing machine is a carding machine and said countermember is a flat bar of travelling flats of the carding machine.

3. The fiber processing machine as defined in claim 2, wherein said face is coplanar with a plane containing points of said second clothing.

4. The fiber processing machine as defined in claim 2, wherein said face is recessed with respect to a plane containing points of said second clothing.

5. The fiber processing machine as defined in claim 1, wherein said countermember is a stationary carding element.

6. The fiber processing machine as defined in claim 1, further comprising means for adjusting said sensor radially to said fiber processing roll.

7. The fiber processing machine as defined in claim 1, wherein said countermember has a width measured parallel to a rotary axis of said fiber processing roll; further wherein said sensor is provided in a plurality along said width.

8. The fiber processing machine as defined in claim 1, further comprising an electronic evaluating unit connected with said sensor.

9. The fiber processing machine as defined in claim 89, further comprising a conductor connecting said sensor with said electronic evaluating device.

10. The fiber processing machine as defined in claim 8, further comprising means for wirelessly connecting said sensor with said electronic evaluating device.

11. The fiber processing machine as defined in claim 1, further comprising a regulating device regulating a distance between said countermember and said fiber processing roll based on a measured value representing said clearance.

12. The fiber processing machine as defined in claim 1, wherein said fiber processing machine is a carding machine including travelling flats and said countermember is a flat bar forming part of said travelling flats; further comprising a flexible bend supporting said travelling flats and a regulating device connected to said sensor for regulating a distance between said countermember and said fiber processing roll by adjusting a position of said flexible bend as a function of signals emitted by said sensor.

13. The fiber processing machine as defined in claim 1, wherein said sensor comprises a precision screw assembly for adjusting a height of said sensor relative to said countermember.

14. In a carding machine comprising
  (a) a carding cylinder carrying a first clothing on the surface thereof;
  (b) travelling flats having a plurality of flat bars each having a second clothing thereon for cooperating with said first clothing during operation of said carding machine;
  (c) an additional flat bar positioned between two clothed flat bars for travel as a unit therewith; and
  (d) an inductive sensor mounted on said additional flat bar for determining a clearance between facing points of said first and second clothings; said sensor having a face set at a position representing a height position of said points of said second clothings; said face of said sensor being positioned directly opposite said points of said first clothing when effecting measurement of said clearance, whereby a direct measurement of said clearance defined between said face and said points of said first clothing is effected.

15. The carding machine as defined in claim 14, further comprising means for adjusting said sensor relative to said height position of said points of said second clothings.

* * * * *